US011669279B2

(12) United States Patent
Pandian

(10) Patent No.: US 11,669,279 B2
(45) Date of Patent: Jun. 6, 2023

(54) RETENTION FRAMEWORK FOR DATA STORES

(71) Applicant: Open Text Holdings, Inc., San Mateo, CA (US)

(72) Inventor: Jegan Pandian, Tirunelveli (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 17/495,353

(22) Filed: Oct. 6, 2021

(65) Prior Publication Data

US 2023/0108434 A1 Apr. 6, 2023

(51) Int. Cl.
| | | |
|---|---|---|
| G06F 13/00 | (2006.01) | |
| G06F 13/28 | (2006.01) | |
| G06F 3/06 | (2006.01) | |
| G06F 9/54 | (2006.01) | |
| G06F 8/77 | (2018.01) | |

(52) U.S. Cl.
CPC ............ *G06F 3/0659* (2013.01); *G06F 3/067* (2013.01); *G06F 3/0619* (2013.01); *G06F 9/541* (2013.01); *G06F 8/77* (2013.01)

(58) Field of Classification Search
CPC .......... G06F 16/00; G06F 16/20; G06F 16/40; G06F 16/30; G06F 16/10
See application file for complete search history.

(56) References Cited

U.S. PATENT DOCUMENTS

2005/0076066 A1* 4/2005 Stakutis .................. G06F 16/10

* cited by examiner

*Primary Examiner* — Yong J Choe
(74) *Attorney, Agent, or Firm* — Sprinkle IP Law Group

(57) ABSTRACT

Systems, methods and products for performing file retention operations in a system in which a content management system accesses multiple cloud-based data stores that are compliant with a common file transfer protocol, but use different vendor-specific protocols for file retention operations, where a retention framework is coupled between the content management system and the data stores. The content management system performs file access operations by accessing an SDK that generates requests for these operations which follow the common set of protocols. The content management system performs file retention operations by accessing a retention framework that uses the information received from the content management system to identify the targeted file, identify the data store in which the targeted file is stored, and generate a request for a retention operation that is configured according to the data-store-specific retention protocols which correspond to the identified data store.

20 Claims, 5 Drawing Sheets

```
605a  PUT /dctm-s3-worm1/01.dat?retention HTTP/1.1
610a  Authorization: AWS4-HMAC-SHA256
615a  Credential=AKIA2JSCEC3MAAOJSZCB/20210517/ap-south-1/s3/aws4_request,
      SignedHeaders=content-md5;content-type;host;x-amz-content-sha256;x-amz-date,
620a  Signature=f2c17ea5ac302219b981658e9e9a478729eb647901b96580b1cce7898ad3daf1
625a  User-Agent: Documentum Server (HTTP Client)
630a  content-length: 101
      content-md5: zEwpNvs2skNp6De1H03agw==
635a  content-type: text/plain
640a  host: s3.ap-south-1.amazonaws.com
      x-amz-content-sha256: aa12298478316974b1d5e19b1392420b3b8576dbfdc97efc38e504e4831
645a  x-amz-date: 20210517T095813Z 650a  <Retention><Mode>GOVERNANCE</Mode><RetainUntilDate>2021-11-28T19:30:00Z</
      RetainUntilDate></Retention>
```

FIG. 6A

```
605b  POST /304098dd-7b89-472b-8ae8-007400517637/09fbf1/80/00/1d/00.dat?extendRetention
      HTTP/1.1
625b  User-Agent: Documentum Server (HTTP Client)  615b
610b  Authorization: AWS4-HMAC-SHA256 Credential=gblpNajGQEUNagFch0nQ/20210603/us-
      east-1/s3/aws4_request, SignedHeaders=content-type;host;new-retention-expiration-date;x-amz-
      date,
620b  Signature=f68e501a4ec3e0c27b577932f4922a5bf4e6732a9c60a10a8e8ca492687553ba
635b  content-type: text/plain
640b  host: lb2.ait.cleversafelabs.com
650b  new-retention-expiration-date: 20210614T183000Z
645b  x-amz-date: 20210603T095010Z
630b  content-length: 0
```

FIG. 6B

```
605c  POST /s3bucket/Jegan1.txt HTTP/1.1
610c  Authorization: AWS4-HMAC-SHA256 Credential=ZGN0bWFkbWlu/20210604/us-east-1/s3/
620bc aws4_request, SignedHeaders=content-type;host;x-amz-date,    615c
620c  Signature=e68f501a4ec3b0c37b5775932f5322a5bf4e6732a9c60a10a8e8ca49264651ab0
635c  Content-Type: text/plain
625c  User-Agent: Documentum Server (HTTP Client)
640c  Host: ten16.hcpdemo8.gssd.hds.com
630c  content-length: 34
645c  x-amz-date: 20210604T095010Z 650c  retention=2020-07-08T10:10:10-0000
```

FIG. 6C

RETENTION FRAMEWORK FOR DATA STORES

TECHNICAL FIELD

This disclosure relates generally to performing retention operations on files in data stores, and more particularly to systems, methods and products for processing retention commands for different data stores that are received in a common format and are processed to generate retention operation requests that are specific to the different data stores.

BACKGROUND

Content management applications may support multiple, different vendors for cloud storage. These vendors may use a variety of different protocols for data storage, access and retention. For example, in one scenario, a content management application is configured to store and access data on cloud data stores of multiple vendors, where all of the data stores use the same protocols for read and write accesses to the data, but the data stores use multiple, different protocols for data retention operations.

In one particular example, each of the data stores is S3 compatible, but each data store is provided by a different vendor and uses a vendor-specific protocol for retention operations. Because the data stores are S3 compatible, the same AWS software developers kit (SDK) can be used to perform push, pull and delete operations for all compatible stores.

S3 refers to the Amazon web services (AWS) simple storage service. While the examples included in this disclosure are S3 compatible, other embodiments may use other protocols for file access which are common to all of the data stores. S3 is a key-value store that is commonly used like a simple file system, where the values of the key-value pairs are the stored files. S3 compatible stores may provide limited capabilities, such as versioning or access bucket policies, but these stores do not provide capabilities such as workflows, virtual documents, metadata attribute storage, etc., which are typically provided by the content management systems that use the S3 compatible stores for content storage.

A customer of a given content management system may choose to use any one of the available S3 compatible data stores. The content management system normally provides a software development kit (SDK) that allows the content management system to work with the chosen data store to enable basic content transfer operations, such as the storage of content and access to the stored content.

A problem arises, however, when it is necessary for the content management system to provide retention support. "Retention support" is used here refers to functions involved in ensuring compliance with rules for storing (retaining) content in a cloud storage for a particular period of time based on a configuration which is provided by a user. The retention functions which are included in the SDKs for the various S3 compliant cloud storages use different methods and protocols so, for example, a command that is generated by a content management system to perform retention operations via an API of a first S3 compliant data store will not work with a second S3 compliant data store.

Thus, in order for the content management system to be able to perform the desired retention functions, it would be necessary to provide separate code corresponding to each of the different S3 compliant cloud stores (since the customer may choose to use any one of the different available cloud stores). This makes it very cumbersome to provide the content management system with the capability to provide retention operations via the SDKs of the corresponding S3 compliant data stores.

It would therefore be desirable to eliminate the need to use the SDK to perform retention operations.

SUMMARY

The present disclosure details systems, methods and products for performing file retention operations in a system in which a content management system accesses multiple cloud-based data stores that are compliant with a common file transfer protocol, but use different vendor-specific protocols for file retention operations.

Embodiments disclosed herein provide a retention framework that is coupled between a content management system and a plurality of different data stores, where each of the data stores is compliant with a common set of protocols for data transport operations, but where the data stores use a plurality of different protocols for file retention operations. The content management system is coupled to the data stores by an SDK, so that the content management system can perform file access operations such as reads and writes through the SDK. The SDK generates requests for these operations which follow the common set of protocols (e.g., S3 compliant protocols). The content management system is also coupled to the data stores via a retention framework. The content management system issues retention commands to the retention framework, and the retention framework uses the information received from the content management system to identify the file that is the target of the retention command, identify the data store in which the target file is stored, and generate a request for a retention operation that is configured according to the data-store-specific retention protocols which correspond to the identified data store.

One embodiment comprises a system for performing retention operations, the system having a retention framework coupled to a content management system and at least two data stores. Each of the data stores adapted to store content objects owned by the content management system. Each of the data stores is adapted to perform a commonly defined set of retention operations, where each of the data stores is adapted to receive retention communications via a unique retention interface, each retention interface using a unique protocol. The retention framework is adapted to receive a retention command from the content management system, the retention command requesting execution of a retention operation on a designated content object. The retention framework identifies the content object based on the retention command, identifies a first one of the data stores which stores the identified content object, identifies a first retention interface used by the first data store, generates a store-specific retention request which is compliant with the first retention interface, and communicates the store-specific retention request to the first data store.

In some embodiments, the content management system is adapted to store a plurality of retention objects, where each of the retention objects contains a corresponding set of retention operation parameters, each retention objects being selectable to apply the corresponding set of retention operation parameters to one or more selected content objects.

In some embodiments, the retention framework is adapted to, for each unique retention interface, map input parameters of the retention command received from the content management system to the corresponding generated store-specific retention request. The retention framework may further be adapted to wait for a communication from the first data store responsive to the store-specific retention request. Still further, the retention framework is adapted to parse the communication received from the first data store to determine a status code that indicates success or failure of the retention operation.

In some embodiments, the retention framework is adapted to generate a message to the content management system indicating the success or failure of the retention operation as indicated by the status code.

In some embodiments, the retention framework includes one or more retention libraries which contain data-store-specific language for generating retention operation requests in compliance with the retention interface protocols of the first data store.

In some embodiments, the retention framework may be adapted to communicate with the first data store via a RESTful application programming interface (API).

In some embodiments, the retention framework may be adapted to create a signature in the store-specific retention request using credentials received from the content management system.

In some embodiments, the retention framework may be adapted to set a retention configuration for the content object in the store-specific retention request.

In some embodiments, the retention framework may be adapted to generate an integrity check value for the store-specific retention request, where the integrity check value is contained in the store-specific retention request.

In some embodiments, the retention framework may be adapted to open a socket connection to the first data store and to communicate the store-specific retention request to the first data store via the socket connection.

An alternative embodiment may comprise a method for performing retention operations. The method may include performing, by a content management system, non-retention file access operations on files in at least two data stores, the non-retention file access operations on each of the data stores being performed via accesses to application programming interfaces (APIs) of a corresponding vendor-specific software developer's kit (SDK). The method further includes performing, by the content management system, file retention operations on the files in the at least two data stores, the file retention operations on the data stores being performed via retention operation requests by the content management system to a common retention framework which is coupled to the content management system and to the data stores, wherein the retention operation requests to the common retention framework by the content management system are vendor-independent. The method further includes receiving, by the common retention framework, each of the retention operation requests, where for each of the retention operation requests, the common retention framework identifies corresponding parameters, including a first set of files on which a retention operation is requested and a first data store on which the first set of files are stored, generates a vendor-specific API request configured for the first data store, and communicates the vendor-specific API request to the first data store.

Another alternative embodiment may comprise a computer program product comprising a non-transitory computer-readable medium storing instructions executable by one or more processors to perform a method as described above.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 6A-6C are examples of vendor-specific commands configured to be forwarded to different data stores having their own vendor-specific procedures and protocols in accordance with some embodiments.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

It should be noted that, while the specific examples provided in the disclosure are focused on the use of S3 compliant data stores, the same techniques could be implemented in systems that access data stores using other protocols.

Additionally, in the descriptions of the following examples, the different retention procedures and protocols of the data stores may be referred to as "vendor-specific." This term is used to describe the procedures and protocols because it is frequently the case that the each vendor has its own retention procedures and protocols. The term "vendor-specific" should be construed, however, to refer to any differences between the retention procedures and protocols of the various data stores, whether the data stores have different vendors or not (e.g., if two data stores use different retention procedures and protocols, they would be construed as vendor-specific, even though they are provided by the same vendor).

"Retention operations" or "file retention operations" is used herein to refer to operations that define time limits for storage of corresponding files stored on the data stores. The files themselves may be referred to as "files," "content objects", "content," or the like.

Initially, content management systems could access a cloud-based data store using an SDK corresponding to that data store. The SDK provided APIs to perform any of the operations available for files on the data store, such as upload and download operations, and in some cases retention operations.

Figure 1:
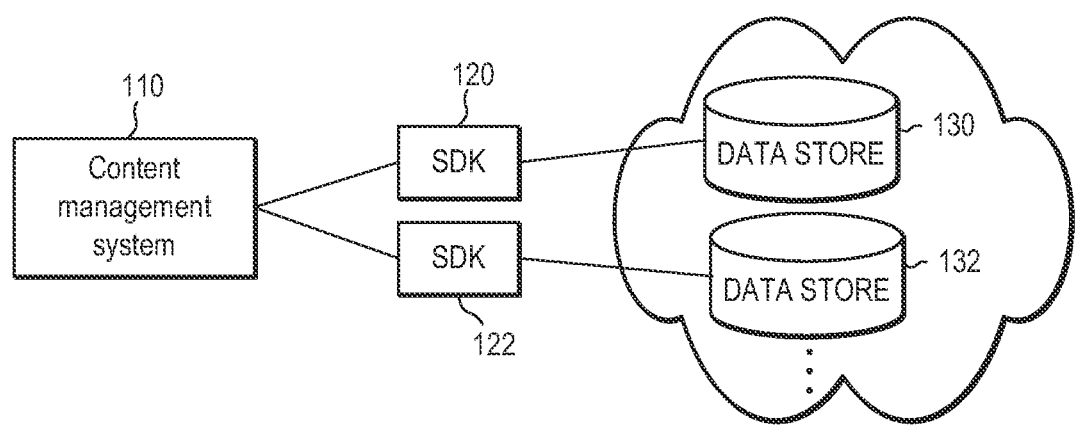
FIG. 1 is a block diagram illustrating a system that uses multiple SDKs to access corresponding cloud-based data stores in accordance with the prior art.

Referring to FIG. 1, a diagram illustrating a system that uses multiple SDKs to access corresponding cloud-based data stores in accordance with the prior art is shown. In this embodiment, content management system 110 is coupled to multiple SDKs (e.g., 120, 122). Each of the SDKs is configured to enable content management system 110 to communicate with a corresponding vendor-specific cloud-based data store (e.g., 130, 132). Although only two data stores are depicted in the figure, there may be additional cloud-based data stores which are available to be accessed by content management system 110.

In the system of FIG. 1, each of the cloud-based data stores (130, 132) is configured to use procedures and protocols that are specific to that particular data store. Accordingly, the corresponding SDKs are provided by the vendors of the data stores to enable content management system 110 to access the data stores via the corresponding vendor-specific procedures and protocols. In other words, SDK 120 is provided by the vendor of data store 130 to enable access to the data store using the particular procedures and protocols for which the data store is configured. Likewise, SDK 122 is provided by the vendor of data store 132 to enable access to the data store using the vendor-specific procedures and protocols for the data store. For each additional cloud-based data store, a corresponding SDK is provided by the vendor so that the data store can be accessed using the specific procedures and protocols for which the vendor configured the data store (or the specific procedures and protocols that were configured for use with the data store).

As the availability and use of cloud-based data stores increased, some content management systems enabled users to access their choice of a number of different cloud-based data stores. The procedures and protocols for the different data stores, however, were originally included in different SDKs for the different data stores. In time, some vendors began to provide cloud-based data stores that used common procedures and protocols (e.g., AWS's S3 protocols) so that customers of a content management system could choose one of the available cloud-based data stores on which to store their files. Because each of the data stores used the same procedures and protocols, the content management system could use the same SDK (e.g., the AWS SDK) to perform operations on the files, regardless of whether the files were stored on one data store or another.

In some cases, the SDKs for the protocol-compliant data stores (e.g., for S3 compliant data stores) started providing retention operations for Write Once, Read Many (WORM) support. WORM storage prevents objects from being deleted or overwritten for a fixed amount of time, or indefinitely (the retention period). These objects may be protected using object or bucket-level configuration of WORM and retention attributes which may have defaults that define a retention policy. This functionality provides extra protection against accidental or malicious deletion as well as regulatory compliance.

Retention operations in data stores commonly were not made available until the vendors for the different data stores had already provided retention functionalities using their own retention APIs in corresponding SDKs. Thus, the SDKs for the protocol-compliant data stores used their own protocols and methodologies, and there was no common way to provide retention functionalities across all of these vendors, and across all vendors' data stores. In order to address this problem via the SDKs, it would have been necessary for the content management system to ship SDKs for all of the different vendors' data stores in order for the customers to be able to perform retention operations on all of these data stores.

Figure 2:
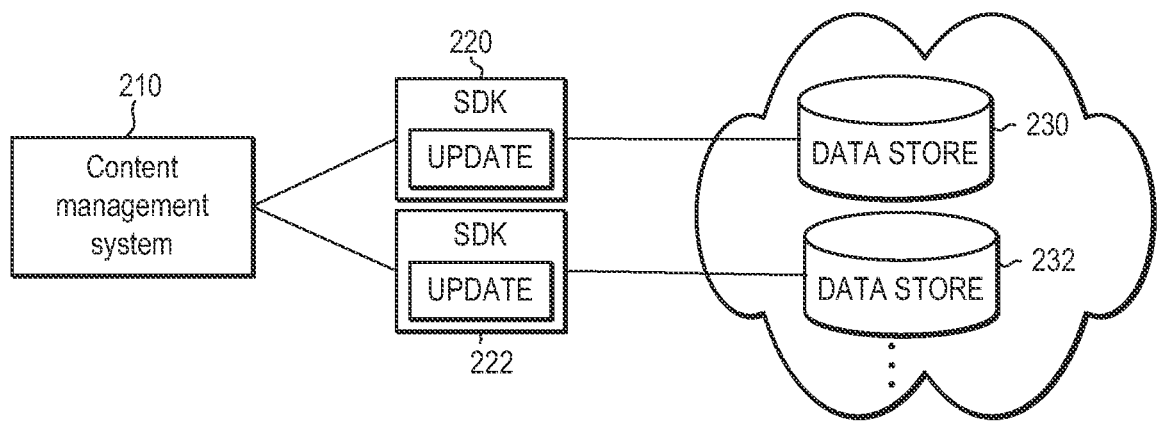
FIG. 2 is a diagram illustrating a system that uses multiple SDKs to perform both file transfer operations and retention operations on multiple vendors' cloud-based data store in accordance with the prior art.

Referring to FIG. 2, a diagram illustrating a system that uses multiple SDKs to perform both file transfer operations and retention operations on multiple vendors' cloud-based data store in accordance with the prior art is shown. The system of FIG. 2 is similar to the system of FIG. 1, in that an SDK (e.g., 220, 222) is provided for each data store (e.g., 230, 232), where the SDK is configured by the vendor of the corresponding data store to provide vendor-specific APIs that are usable by content management system 210 to access the data store.

In FIG. 2, however, each SDK includes corresponding updates which are configured to provide retention functionality for the corresponding data store. For example, SDK 220 includes update 221 which provides APIs configured for vendor-specific retention functionality with respect to data store 230. Similarly, SDK 222 includes update 223 which incorporates APIs to provide retention functionality for data store 232. Each of updates 221 and 223 is configured to follow the vendor-specific procedures and protocols of the corresponding data store (230 and 232, respectively).

Because it was cumbersome to provide separate code for retention operations corresponding to each of the different S3 compliant cloud stores, embodiments of the present invention provide a retention framework that performs the desired retention functions. The retention framework handles operations on selected files, such as setting a fixed retention, setting a retention on the backend, setting a new retention period, event-based retention, retention hold, etc. These are just a few of the operations that the retention framework can perform, and additional functions can be added. Further, the retention functions can be adding for data stores provided by any new vendors, based on the corresponding configurations of the vendors' data stores. The retention framework itself, however, does not have to be changed.

Embodiments disclosed herein may provide a number of advantages over existing systems. For example, embodiments may reduce SDK dependency, since any application can use the retention framework to support retention functionalities for all data stores that use compatible protocols (e.g., S3 compatible data stores) without shipping individual SDKs for each vendor. Embodiments of the present invention may also be easily extensible to support new vendors, as configuration XML with standard retention parameters expected by the store can be created and the XML passed as input to the data stores. Further, embodiments may provide support for non-compatible (e.g., non-S3-compatible) data stores, since the same logic can be extended to support retention for other cloud-based data stores by changing only the authorization mechanism. Still other advantages may be apparent to those skilled in the field.

Figure 3:
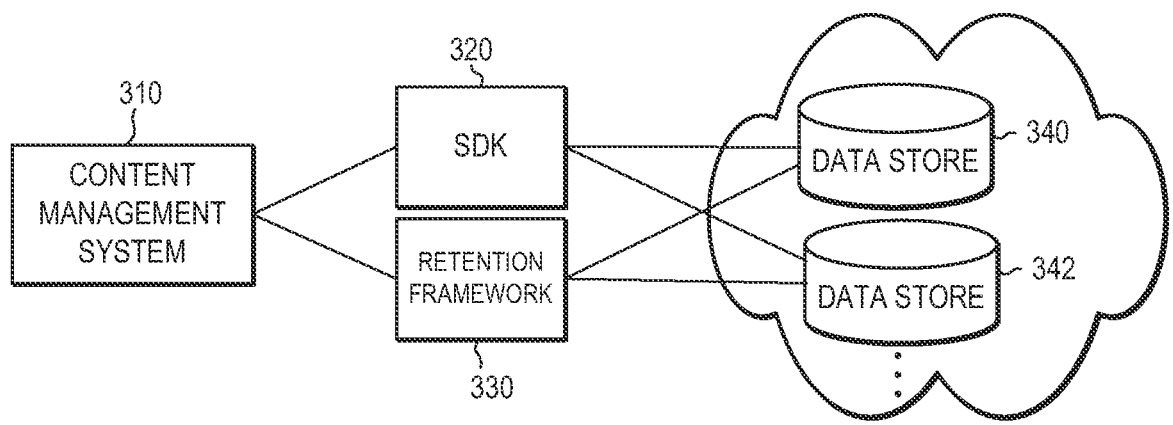
FIG. 3 is a diagram illustrating a system that uses a single SDK and a single retention framework in accordance with some embodiments.

Referring to FIG. 3, a diagram illustrating a system that uses a single SDK and a single retention framework in accordance with some embodiments is shown. In this system, the SDK is configured to perform file transfer operations on multiple cloud-based data stores which are compliant with a common set of protocols. ("Common" is used here to refer to the fact that the same protocols are used for all of the compliant data stores, rather than to indicate that the protocols are necessarily used widely or frequently.) The retention framework configured to provide file retention functionality for each of the data stores, where the procedures and protocols used by each data store may be unique, rather than being common to all of the data stores.

In the system of FIG. 3, content management system 310 is coupled to SDK 320 and retention framework 330. SDK 320 is configured to receive commands/requests from content management system 310 for file transfer operations (e.g., uploads, downloads, deletes, etc.) on files stored in data stores 340 and 342. As noted above, all of the data stores (including 340, 342, and any other available compliant data stores) use the same procedures and protocols for file transfer operations. Each of the data stores, however, may use a unique set of procedures and protocols for file retention operations. It should be noted that, while each of the data stores in this example uses a unique, vendor-specific set of procedures and protocols for file retention, the vendor-specific procedures and protocols in other embodiments may not be unique to each, individual data store, but may instead be unique to groups or subsets of the available cloud-based data stores.

Because each of the data stores (including 340, 342, and any other available, compliant data stores) is compliant with a common set of procedures and protocols (e.g., AWS S3 procedures and protocols), only a single SDK is necessary. This SDK provides APIs that are accessible by content management system 310 to perform file transfer operations. Based on the commands/requests received from content management system 310, the APIs generate commands/requests that are compliant with the common procedures and protocols, and forwards these commands/requests to the data stores which store the particular files which are targeted by the requested operations. since each of the data stores is compliant with the common set of procedures and protocols, the commands/requests which are forwarded from the SDK to the data store containing the file targeted by the commands/requests are independent of the data store. In other words, the forwarded command/request is the same, regardless of which data store is targeted by the command/request.

Because each of the data stores (340, 342, and other available data stores) uses a vendor-specific set of procedures and protocols for file retention operations, retention framework 330 cannot send commands/requests to each of the different data stores that use the same procedures and protocols. Retention framework 330 must instead receive a command/request from content management system 310, from which the retention framework identifies the file(s) targeted by the command/request, the retention operation to be performed on the targeted file(s), the data store on which the targeted file(s) are stored, and the procedures and protocols used by this data store. Retention framework 330 must the use this information to generate a command/request which is specifically configured for the data store that contains the targeted file(s), and must forward this specifically configured command/request to the data store to perform the requested file retention operation.

In some embodiments, the retention framework uses RESTful APIs to access the cloud-based data stores (which may be in both public and private clouds). The retention framework may use HTTP or HTTPS semantics like HEAD, GET, PUT or POST to submit requests and receive responsive information. The retention framework may do the following:

generate standard headers for rest APIs like user-agent, host, date, content-type, content-length etc.;
simulate signatures (e.g., AWS Signature Version 4 by creating a signature using valid credentials and including the signature in the authorization request header
create a store-specific retention configuration and set it as a header or in the body of a request as required by the storage vendor(s);
calculate Content-MD5/content-sha256 for integrity purposes, and set appropriate headers in the request
create an HTTP request, open a socket connection to storage (with tunneling or proxy if required for public cloud), and send the request over a socket
wait for an http response, and parse the response to confirm if its success or failure based on the http status code.

The framework may include APIs to provide support for applications for working with retention policies, such as setting the default, minimum and maximum retention period on an S3 bucket, getting retention information configured in a bucket, adding or removing a legal hold to or from an object, listing legal holds on an object, extending the retention period of an object, checking the retention policy on an object, and providing support for indefinite and event based retention.

Figure 4:
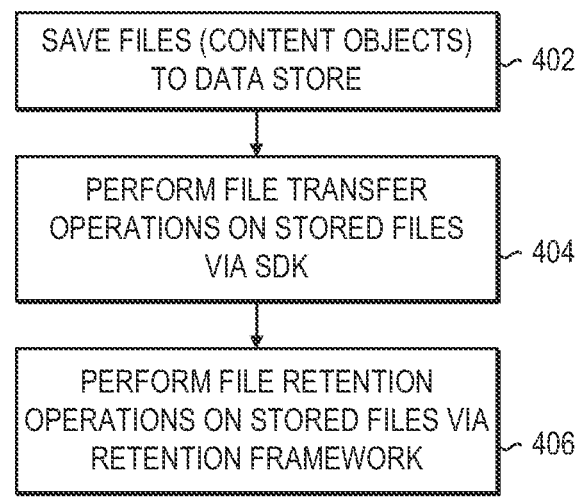
FIG. 4 is a flow diagram is provided to illustrate a basic method of operation of a system in which a retention framework is used to perform vendor-specific retention operations on a set of cloud-based data stores in accordance with some embodiments.

Referring to FIG. 4, a flow diagram is provided to illustrate a basic method of operation of a system in which a retention framework is used to perform vendor-specific retention operations on a set of cloud-based data stores in accordance with some embodiments. As noted above, the data stores are all compliant with a common set of procedures and protocols, but retention functions are vendor-specific, and do not follow a common set of procedures and protocols. For purposes of this example, the data stores will be considered to be S3-compliant.

As depicted in FIG. 4, files are initially stored by a content management system on a cloud-based data store using the SDK (step 402). Since the data store is S3 compliant, the write (file store) operation can be performed using the SDK. The same is true of any of the available S3 compliant data stores. After the files have been stored on the data store, additional file transport operations on the stored file (e.g., read, downloaded, etc.) can also be performed by the content management system via the SDK (step 404). Since the retention operations do not follow common protocols, commands/requests for these operations are sent by the content management system to the retention framework, which generates vendor-specific commands/requests and forwards them to the data stores in which the files are stored (step 406). Thus, the system uses the SDK to perform non-retention operations on files in any of the compliant cloud-based data stores, and uses the retention framework to perform retention operations on these files, where the retention framework generates vendor-specific commands/requests for these operations on the different data stores based on common-format commands/requests that are received from the content management system.

In order to provide the retention functionality through the retention framework, it is necessary to evaluate how each data store is using the retention functionality (i.e., to determine exactly what the final communication is expected by the data store to perform a given retention operation). This same evaluation (e.g., examining the vendors' SDKs, understanding their logic, checking to see how the functionality is working) has to be performed for each different vendor's data store so that the retention functions can be performed by the retention framework instead of having to update the vendor-specific SDKs for each of the data stores to provide APIs for retention operations on the different data stores.

When a command/request for a retention operation is received from the content management system, the information that is common to the retention operations for the different vendors is extracted and retained so that it can be used for any of these vendors. Differences between the vendor-specific procedures and protocols implemented by the different data stores can be accounted for by generating different headers, formatting, protocols, or other information as may be required for the retention operations for specific vendors. In other words, the input information provided by the content management system is parsed and used to generate the communications necessary for any one of the vendors to perform the requested retention operations.

This is accomplished by maintaining a mapping between the inputs to the retention framework and the individual requirements of each system. The retention framework may initially include information for a first set of vendors' data stores, and as new vendors' data stores become available, the information for these new data stores can be obtained so that a mapping corresponding to the configuration of each new data store can be added to the retention framework. The retention framework can then support retention operations in these new data stores based on the corresponding configuration parameters.

Thus, when a new vendor's data store becomes available, read and write operations can be performed using the existing (e.g., AWS S3) SDK because the data store is compliant with these procedures and protocols. The SDK is not configured to handle the retention operations on the new data store, because the data store uses vendor-specific procedures and protocols for these operations. When the vendor-specific retention procedures and protocols have been examined and analyzed, however, the retention framework can store a mapping between the retention information received from the content management system and the required communication to the data store. This mapping can be generated based on the documentation for the new data store.

Then, the content management system can generate a command for the new vendor-specific data store in a standard format for the retention framework (i.e., the content management system provide inputs for the retention command in the same way that they would for any other data store). The input will be parsed according to the configuration of the target data store, and a header or other components which are appropriate to and/or required by the target data store are generated. These components are formatted into a command/request to perform the retention operation on specified files in the target data store, where the request meets the vendor-specific requirements of the target data store.

While the retention framework maintains mappings of input information received from the content management system to the required output communications to the data stores, the content management system's servers store specific information for the data stores, such as the endpoint credentials for the data store, the corresponding vendor details, etc. The content management system may also store retention objects which contain configuration information that can be applied to files stored on the cloud-based data stores. Retention objects may be configured by end-users with retention dates, event-based retention, retention holds, and similar information.

Then, when a file is stored on one of the data stores, a specific retainer object can be applied to the file, with the retention framework generating the vendor-specific commands/requests to handle pushing the retention operation to the data store. As noted above, the content management system.

A single retention object can be applied to any number of documents. The retainer objects are not tied to the content objects on the content management system—they are independent, and a single retention object can be applied to any number of content objects (files). A number of different retention objects with different requirements can be configured and stored by the content management system.

The content management system stores a record of the connection between the content object and the retention object. In some embodiments, once a retention operation is completed successfully, the content management system stores the retention date and the retention object using some unique key. This information is maintained because if changes are made to the retention object, these changes would need to be applied to the stored objects that are associated with the retention object. For example, if the retention date for a retention object is extended, this change is applied to all of the content objects that are associated with the retention object. This update can be performed automatically by the content management system when the change is made to the retention object.

Figure 5A:
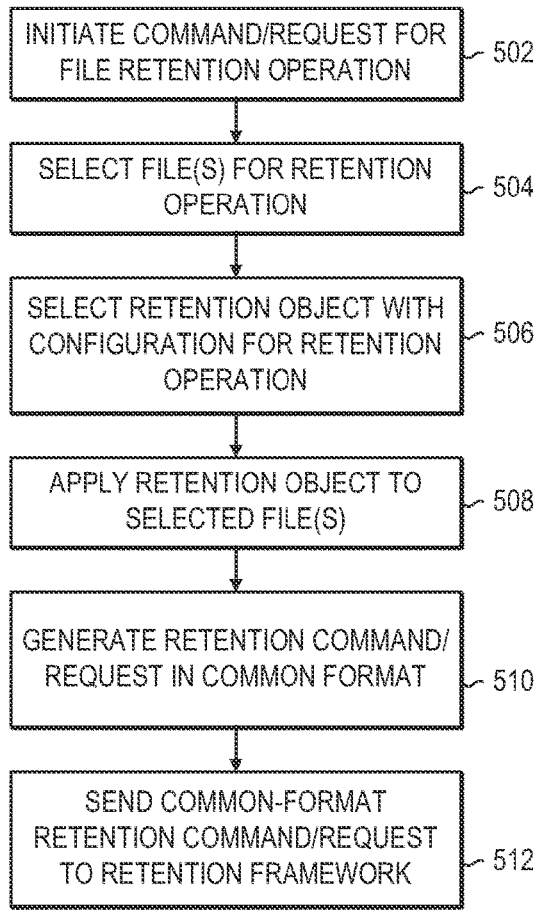
FIGS. 5A and 5B are a pair of flow diagrams are shown to illustrate the operation of the system in performing retention operations in accordance with some embodiments.
Figure 5B:
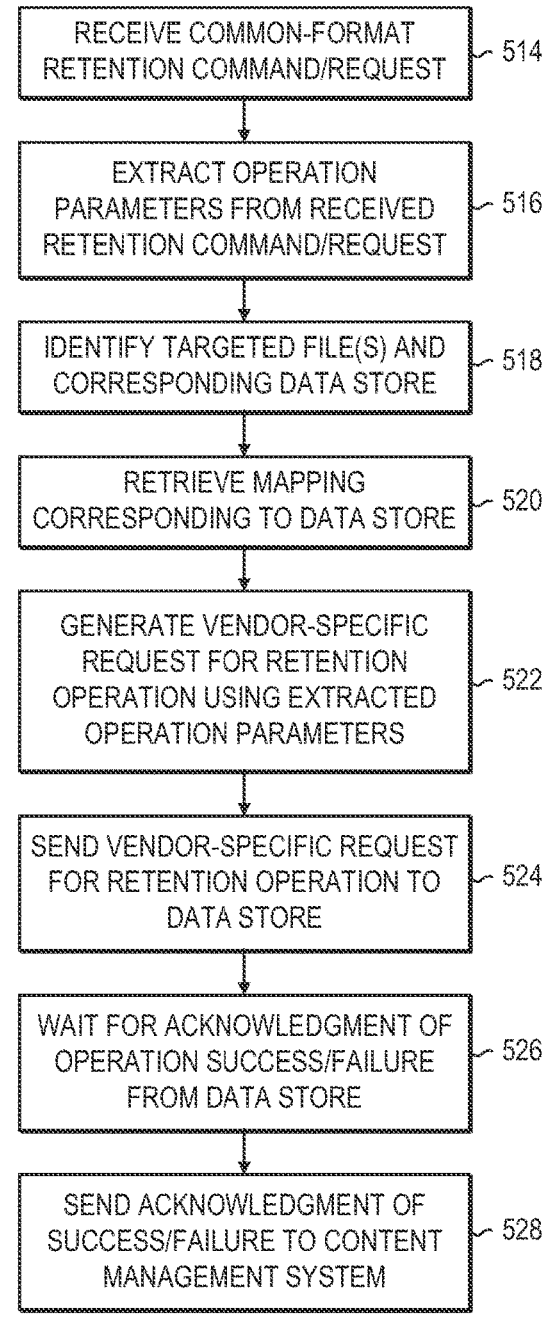

Referring to FIGS. 5A and 5B, a pair of flow diagrams are shown to illustrate the operation of the system in performing retention operations in accordance with some embodiments. FIG. 5A shows a portion of the process that is performed by the content management system, while FIG. 5B shows a portion of the process that is performed by the retention framework.

Referring to FIG. 5A, when a user determines that a retention operation should be performed on a file stored in one of the cloud-based data stores, the user initiates a retention command/request at the content management system (step 502). The user does so by selecting one or more files on which the retention operation will be performed (step 504), then selects a retention object that defines parameters of the retention operation (e.g., a period of time for which a file will be retained, an end date for the retention, etc.) to be performed on the files (step 506). The parameters defined in the retention object are then applied to the selected file(s) (step 508), and a retention command/request specifying this information is generated by the content management system (510).

The command/request generated by the content management system uses a format that is independent of the specific one of the data stores in which the selected files are stored. In other words, the content management system uses a common format that is the same, regardless of whether the selected files are in a first one of the data stores, a second one, a third one, and so on. The content management system then sends the generated command/request to the retention framework (step 512).

Referring to FIG. 5B, the command/request generated by the content management system is received by the retention framework (step 514). The retention framework extracts from the received, common-format command request the information that is necessary to generate a vendor-specific command/request (step 516). Using the extracted information, the retention framework identifies the files on which the retention operation is to be performed, as well as the specific one of the cloud-based data stores on which the files are stored (step 518). Based on the identified one of the data stores, the retention framework retrieves the corresponding mapping from a database of mappings for all of the available cloud-based data stores (step 520). The retrieved mapping provides information which identifies how the information provided by the content management system is used to construct a vendor specific command/request for the corresponding one of the cloud-based data stores (step 522).

Referring to FIGS. 6A-6C, several examples of vendor-specific commands configured to be forwarded to different data stores having their own vendor-specific procedures and protocols. Each of FIGS. 6A-6C is an example of a command that is generated by the retention framework to perform the same retention operation on a different cloud-based data store that uses a different protocol for the file retention operation. Each of the example commands is generated using the information from the common-format command/request received by the retention framework from the content management system, but has its own, unique structure which is dictated by the vendor-specific protocols of the corresponding data store.

It should be noted that, in FIGS. 6A-6C, the same reference numbers are used in each of the figures to indicate particular components of the command/request generated by the retention framework, but each reference number includes a subscript (a, b, or c) to indicate the component of a specific one of the examples. For instance, reference number 605 indicates the type of the command/request, so reference number 605a indicates the type in the example of FIG. 6A, while reference number 605b indicates the type in the example of FIG. 6B, and reference number 605c indicates the type in the example of FIG. 6C.

As shown in FIGS. 6A-6C, each of the example commands identifies an HTTP method 605 that is used to implement the retention operation. In the example of FIG. 6A, a PUT method 605a is used, while a POST method 605b and 605c is used in the examples of FIGS. 6B-6C. Each of the example commands further identifies an authorization 610 and a credential 615 which are extracted from the common-format command received from the content management system. Each example command also includes a signature 620 generated by the retention framework, as well as an identifier of the user-agent (the content management system).

Each of the examples of FIGS. 6A-6C identifies a content length 630 and content type 635 of the request. Each example further identifies the data stores 640 which is the target of the request, as well as a timestamp 645 for the request. Finally, each example includes an indication of the retention operation to be performed including, in this case, a date and time 650 until which the target file(s) will be retained.

Referring again to FIG. 5B, once the vendor-specific command/request for the identified data store has been using the information from the common knife and format content management system command/request, the vendor-specific command/request is forwarded to the selected one of the cloud-based data stores (step 524). The retention framework then waits for an acknowledgment from the data store (step 526). The acknowledgment may be a positive acknowledgment indicating that the requested retention operation was successfully performed, or it may be a negative acknowledgment indicating that the requested retention operation failed, or was not completed. When the acknowledgment is received from the data store, the retention framework forwards the acknowledgment or a corresponding message to the content management system indicating whether or not the requested operation was successfully completed (step 528).

Figure 7:
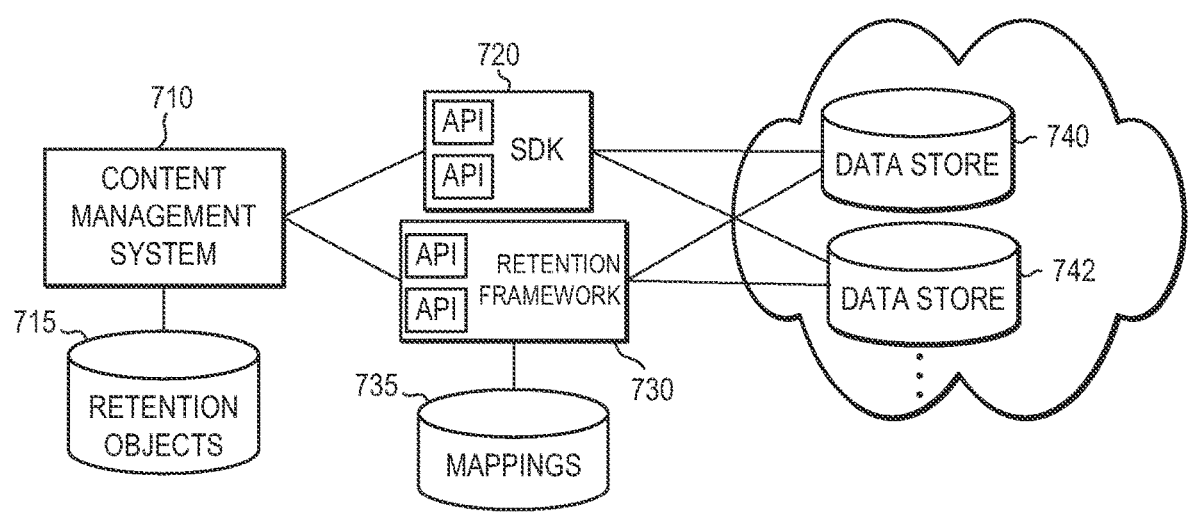
FIG. 7 is a diagram illustrating the structure of an exemplary system in accordance with some embodiments.

The functionalities described herein may be implemented in systems having varying topographies. Referring to FIG. 7, the structure of an exemplary system is shown. In this embodiment, a content management system 710 is coupled to an SDK 720 and retention framework 730, each of which is in turn coupled to a set of cloud-based data stores 740, 742. Although only two cloud-based data stores are depicted in the figure, it should be noted that there may be additional such data stores.

As noted above, each of cloud-based data stores 740 and 742 (and any additional data stores) use a common protocol for file transfer operations. For example, the data stores may be S3 compliant data stores. Content management system 710 accesses data stores 740 and 742 via APIs of SDK 720. Since data stores 740 and 742 are compliant with the common file transfer protocol, an file transfer operations command/request communicated from content management system 710 to SDK 720 results in the generation by the SDK of a request for the corresponding file transfer operation, where the generated request is the same, regardless of which of the data stores is targeted by the operation.

As further noted above, although the data stores are compliant with the common file transfer protocols, the data stores use vendor-specific protocols for file retention operations. The vendor-specific protocols include two or more unique protocols. In some embodiments, each data store has a different set of retention operation protocols, but in some cases, two or more of the data stores may use the same protocols for file retention operations. Content management system 710 communicates common-format commands/requests for file retention operations to retention framework 730 via APIs provided by the retention framework. Retention framework 730 uses the information provided by content management system 710 to generate vendor-specific requests for the corresponding file retention operations. The generated requests will have different content and/or formats, depending upon the targeted data store.

As explained above, content management system 710 stores retention objects that include configuration information for file retention operations. In the embodiment of FIG. 7, The retention objects are stored by content management system 710 in a database 715, which is maintained in a memory or data store coupled to the content management system. Content management system 710 may retrieve any of the stored retention objects and apply the objects to selected files. The resulting commands/requests for file retention operations are forwarded to retention framework 730, which parses the received command/requests and identifies the files and data stores targeted by the commands/requests. Retention framework 730 retains, in a corresponding database 735, mappings of input information in the received commands/requests to corresponding requests for each of cloud-based data stores 740 and 742.

Retention framework 730 uses the information identifying the targeted data store to retrieve the corresponding mapping from database 735, and it uses this mapping to generate a vendor-specific retention operation request corresponding to the command/request received from the content management system. The generated vendor-specific retention operation request is then forwarded to the targeted data store to perform the requested operation. In some embodiments, retention framework 730 waits for an acknowledgment that the generated vendor-specific request for the file retention operation was received and/or successfully completed by the targeted data store. When the acknowledgment is received, the retention framework sends a corresponding notification to the content management system.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for performing retention operations comprising:
   a retention framework coupled to a content management system and at least two data stores;
   each of the at least two data stores adapted to store content objects owned by the content management system;
   each of the at least two data stores adapted to perform a commonly defined set of retention operations;
   each of the at least two data stores adapted to receive retention communications via a unique retention interface, each retention interface using a unique protocol;
   the retention framework adapted to:
   receive a retention command from the content management system, the retention command requesting execution of a retention operation on a designated content object;
   identify the content object based on the retention command;
   identify a first data store of the at least two data stores, the first data store storing the identified content object;
   identify a first retention interface used by the first data store;
   generate a store-specific retention request which is compliant with the first retention interface;
   communicate the store-specific retention request to the first data store.

2. The system of claim 1, the content management system adapted to store a plurality of retention objects, wherein each of the retention objects contains a corresponding set of retention operation parameters, each retention objects being selectable to apply the corresponding set of retention operation parameters to one or more selected content objects.

3. The system of claim 1, wherein the retention framework is adapted to, for each unique retention interface, map input parameters of the retention command received from the content management system to the corresponding generated store-specific retention request.

4. The system of claim 1, the retention framework further adapted to wait for a communication from the first data store responsive to the store-specific retention request.

5. The system of claim 4, the retention framework further adapted to parse the communication received from the first data store to determine a status code that indicates success or failure of the retention operation.

6. The system of claim 5 the retention framework further adapted to generate a message to the content management system indicating the success or failure of the retention operation as indicated by the status code.

7. The system of claim 1, wherein the retention framework comprises a plurality of retention libraries which contain data-store-specific language for generating retention operation requests in compliance with the retention interface protocols of the first data store.

8. The system of claim 1, the retention framework adapted to communicate with the first data store via a RESTful application programming interface (API).

9. The system of claim 1, the retention framework adapted to create a signature in the store-specific retention request using credentials received from the content management system.

10. The system of claim 1, the retention framework adapted to set a retention configuration for the content object in the store-specific retention request.

11. The system of claim 1, the retention framework adapted to generate an integrity check value for the store-specific retention request, wherein the integrity check value is contained in the store-specific retention request.

12. The system of claim 1, the retention framework adapted to open a socket connection to the first data store and to communicate the store-specific retention request to the first data store via the socket connection.

13. A method for performing retention operations, the method comprising:
   performing, by a content management system, non-retention file access operations on files in at least two data stores, the non-retention file access operations on each of the at least two data stores being performed via accesses to application programming interfaces (APIs) of a corresponding vendor-specific software developer's kit (SDK);
   performing, by the content management system, file retention operations on the files in the at least two data stores, the file retention operations on each of the at least two data stores being performed via retention operation requests by the content management system to a common retention framework which is coupled to the content management system and to each of the at least two data stores, wherein the retention operation requests to the common retention framework by the content management system are vendor-independent;
   receiving, by the common retention framework, each of the retention operation requests, wherein for each of the retention operation requests, the common retention framework:
   identifies corresponding parameters, including a first set of files on which a retention operation is requested and a first data store on which the first set of files are stored,
   generates a vendor-specific API request configured for the first data store, and
   communicates the vendor-specific API request to the first data store.

14. The method of claim 13, further comprising storing, by the content management system, a plurality of retention objects, wherein each of the retention objects contains a corresponding set of retention operation parameters, each retention objects being selectable to apply the corresponding set of retention operation parameters to one or more selected content objects.

15. The method of claim 13, further comprising mapping, by the retention framework for each unique retention interface, input parameters of the retention command received from the content management system to the corresponding generated store-specific retention request.

16. The method of claim 13, further comprising receiving, by the retention framework, a communication from the first data store responsive to the store-specific retention request, parsing, by the retention framework, the communication received from the first data store to determine a status code that indicates success or failure of the retention operation, generating, by the retention framework, a message indicating the success or failure of the retention operation as indicated by the status code, and sending, by the retention framework, the message indicating the success or failure of the retention operation to the content management system.

17. A computer program product comprising a non-transitory computer-readable medium storing instructions executable by one or more processors to:
perform non-retention file access operations on files in at least two data stores coupled to a content management system, the non-retention file access operations on each of the at least two data stores being performed via accesses to application programming interfaces (APIs) of a corresponding vendor-specific software developer's kit (SDK);
perform file retention operations on the files in the at least two data stores, the file retention operations on each of the at least two data stores being performed via retention operation requests by the content management system to a common retention framework which is coupled to the content management system and to each of the at least two data stores, wherein the retention operation requests to the common retention framework by the content management system are vendor-independent;
receive each of the retention operation requests, wherein for each of the retention operation requests, the common retention framework:
identifies corresponding parameters, including a first set of files on which a retention operation is requested and a first data store on which the first set of files are stored,
generates a vendor-specific API request configured for the first data store, and
communicates the vendor-specific API request to the first data store.

18. The computer program product of claim 17, the instructions further executable by one or more processors to store, by the content management system, a plurality of retention objects, wherein each of the retention objects contains a corresponding set of retention operation parameters, each retention objects being selectable to apply the corresponding set of retention operation parameters to one or more selected content objects.

19. The computer program product of claim 17, the instructions further executable by one or more processors to map, by the retention framework for each unique retention interface, input parameters of the retention command received from the content management system to the corresponding generated store-specific retention request.

20. The computer program product of claim 17, the instructions further executable by one or more processors to receive, by the retention framework, a communication from the first data store responsive to the store-specific retention request, parse, by the retention framework, the communication received from the first data store to determine a status code that indicates success or failure of the retention operation, generate, by the retention framework, a message indicating the success or failure of the retention operation as indicated by the status code, and send, by the retention framework, the message indicating the success or failure of the retention operation to the content management system.

* * * * *